(12) United States Patent
Preisler

(10) Patent No.: US 6,843,525 B2
(45) Date of Patent: Jan. 18, 2005

(54) REINFORCED COMPOSITE VEHICLE LOAD FLOOR OF THE CELLULAR CORE SANDWICH-TYPE

(75) Inventor: Darius J. Preisler, Macomb, MI (US)

(73) Assignee: Patent Holding Company, Fraser, MI (US)

(*) Notice: Subject to any disclaimer, the term of this patent is extended or adjusted under 35 U.S.C. 154(b) by 6 days.

(21) Appl. No.: 10/016,274

(22) Filed: Oct. 30, 2001

(65) Prior Publication Data

US 2003/0205917 A1 Nov. 6, 2003

(51) Int. Cl.[7] .............................................. B60N 27/00
(52) U.S. Cl. .............................. 296/193.07; 296/184.1; 428/118
(58) Field of Search ................... 296/193.07, 184.1; 156/285, 286, 287, 292, 297; 428/116, 117, 118, 78, 79, 47, 55; 52/782.11, 793.1; 244/119, 120, 123–126

(56) References Cited

U.S. PATENT DOCUMENTS

| | | | |
|---|---|---|---|
| 5,891,560 | A | 4/1999 | Edwards et al. |
| 6,036,252 | A | 3/2000 | Hecksel et al. |
| 6,039,351 | A | 3/2000 | Jones et al. |
| 6,045,174 | A | 4/2000 | Brancaleone et al. |
| 6,050,630 | A | * 4/2000 | Hochet .................. 296/193.07 |
| 6,053,566 | A | 4/2000 | Aghssa et al. |
| 6,065,795 | A | 5/2000 | Forster et al. |
| 6,126,219 | A | 10/2000 | Wilkinson et al. |
| 6,128,815 | A | 10/2000 | Jurica et al. |
| 6,136,259 | A | 10/2000 | Puffenberger et al. |
| 6,165,604 | A | 12/2000 | Edwards et al. |
| 6,170,905 | B1 | 1/2001 | Jurica |
| 6,179,362 | B1 | 1/2001 | Wisniewski et al. |
| 6,209,205 | B1 | 4/2001 | Rumpel et al. |

FOREIGN PATENT DOCUMENTS

| | | | |
|---|---|---|---|
| EP | 0649 736 | 4/1995 | |
| FR | 2711573 | 5/1995 | |
| WO | WO99/64224 | * 12/1999 | .................. 156/297 |

OTHER PUBLICATIONS

D'Hooghe, E.L., et al., Applications For Fulcrum Thermoplastic Composite Technology, The Dow Chemical Company.

D'Hooghe, E.L., et al., Thermoplastic Composite Technology Tougher Than You Think, The Dow Chemical Company Advanced Materials, Dec. 1, 2000, vol. 12, No. 23, pp. 1865–1868.

Edwards, Chris, Thermoplastic Pultrusion Promises New Synergies, Reinforced Plastics, vol. 45. No. 4, Apr. 2001.

Rules of Composite Technology, Fulcrum Thermoplastic Composite Technology, The Dow Chemical Company, Midland, Michigan, Dec. 2000, pp. 1–5.

The Dow Chemical Company, Fulcrum Thermoplastic Composite Technology, http://www.dow.com/fulcrum/index.htm.

Dow Plastics, Typical Properties For Composites Produced Using Fulcrum Thermoplastic Composite Technology.

* cited by examiner

Primary Examiner—Lori L. Coletta
(74) Attorney, Agent, or Firm—Brooks Kushman P.C.

(57) ABSTRACT

The invention relates to reinforced composite vehicle load floors of the sandwich-type having a cellular core. In a method for making a load floor of the invention, a stack is formed that is made up of: a load-bearing upper skin made of a reinforced thermoplastics material; an upper skeletal frame structure of reinforcing slats each of which is made of a reinforced thermoplastic composite or pultrusion; a cellular core made of a thermoplastic material; a lower skeletal frame structure of reinforcing slats each of which is also made of a reinforced thermoplastic composite or pultrusion; and a bottom skin made of a reinforced thermoplastic material. Each of the frame structures of reinforcing slats has a surface area that is smaller than the surface area of each of the skins. The frame structures of reinforcing slats are positioned symmetrically about a plane formed by the cellular core against the skins.

19 Claims, 2 Drawing Sheets

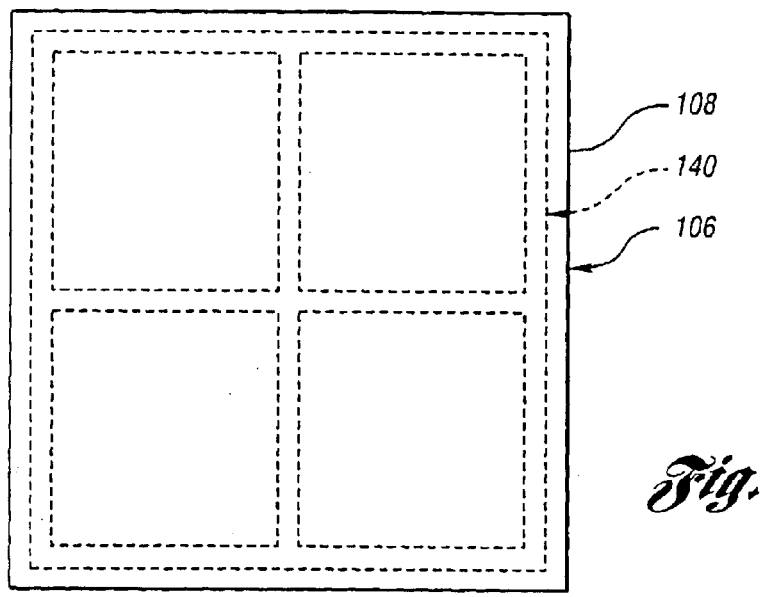
Fig. 3
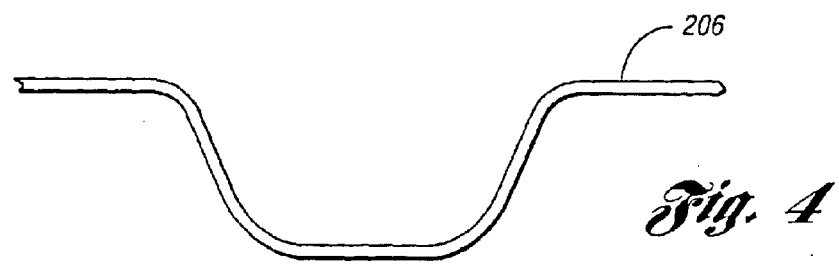
Fig. 4
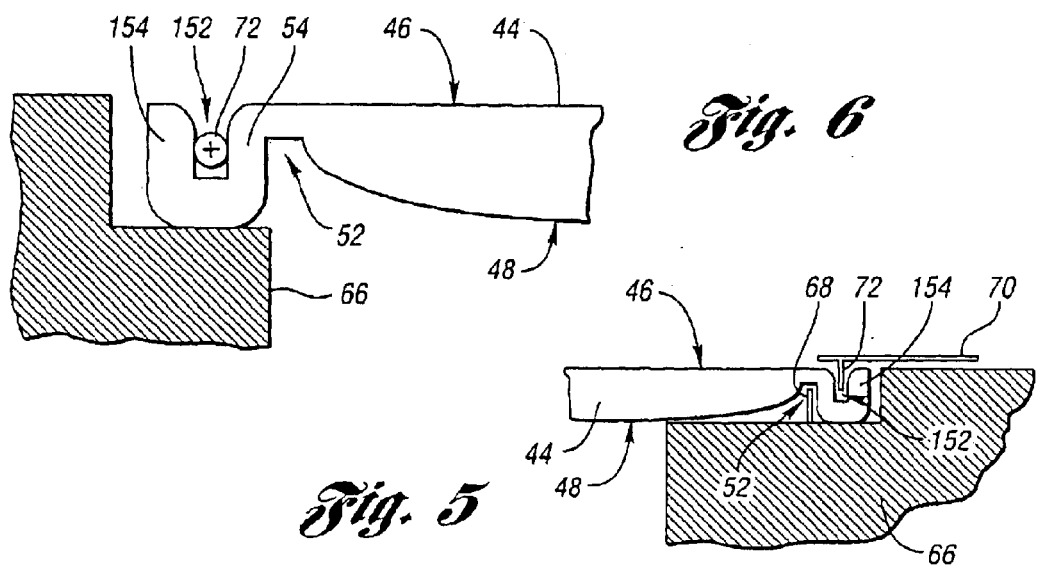
Fig. 6
Fig. 5

REINFORCED COMPOSITE VEHICLE LOAD FLOOR OF THE CELLULAR CORE SANDWICH-TYPE

CROSS-REFERENCE TO RELATED APPLICATIONS

This application is related to U.S. application Ser. No. 09/485,142, filed Mar. 1, 2000 entitled "A Method of Making a Reinforced Composite Panel of the Cellular-Core Sandwich Type, and a Panel Obtained By Performing Such a Method." This application discloses a method of making locally-reinforced composite panels of the cellular core sandwich-type using reinforcing plies of thermoplastic material. This application is also related to U.S. application filed Sep. 21, 2001 and entitled "Engine Under Tray for a Vehicle With Improved Strength" and U.S. application Ser. No. 09/525,785, filed Mar. 15, 2000, entitled "Method and System for Molding Thermoplastic Sandwich Material and Deep-Drawn Article Produced Thereby."

BACKGROUND OF THE INVENTION

1. Field of the Invention

The present invention relates generally to vehicle load floors of sandwich-type composite structure having a cellular core and, in particular, to such load floors whose structure is reinforced locally.

2. Background Art

Referring to the drawings and, in particular, to FIG. 1, a prior art underbody assembly 10 is shown for a motor vehicle, generally indicated at 12, in accordance with U.S. Pat. No. 6,126,219. The motor vehicle 12 includes a pair of body side assemblies 14 operatively connected to sides of the underbody assembly 10. It should be appreciated that only one body side assembly 14 is illustrated.

The motor vehicle 12 includes a front end assembly 16 operatively connected to a forward or front end of the underbody assembly 10. The motor vehicle 12 also includes a pair of rear cargo doors 18 operatively adjoined to a rear or back end of the underbody assembly 10. It should be appreciated that the motor vehicle 12 includes a roof (not shown) and other closures (not shown) which are also common for the two load floor heights. It should also be appreciated that, except for the underbody assembly 10, the motor vehicle 12 is conventional and known in the art.

The underbody assembly 10 includes an underbody load floor or floor pan 20 extending longitudinally and transversely. The underbody assembly 10 also includes a side sill 22 extending longitudinally along each side of the floor pan 20. The side sill 22 has a top surface 24 and a bottom surface 26 and a ledge 28 extending longitudinally and disposed between the top surface 24 and the bottom surface 26. For a high underbody load height for a rear-wheel drive configuration of the motor vehicle 12 illustrated in FIGS. 1 and 3, the floor pan 20 is operatively connected to the top surface 24 of the side sills 22 by suitable means such as welding. It should be appreciated that the side sills 22 are used along the load floor to body side interface along the edges of the floor pan 20 to take up the different position of the floor pan 20 relative to the body side assemblies 14.

The underbody assembly 10 includes a transition structure, generally indicated at 30, operatively connected between the floor pan 20 and the front end assembly 16. The transition structure 30 includes a pair of side members 32 extending longitudinally and transversely spaced. The side members 32 are operatively connected to front rails (not shown) of the front end assembly 16 by suitable means such as welding. The transition structure 30 also includes a floor pan extension 34 extending transversely and disposed on an upper surface of the side members 32. The floor pan extension 34 is generally planar and operatively connected to the side members 32 by suitable means such as welding. It should be appreciated that the floor pan extension 34 is used to make a transition between the floor pan 20 and a front floor 35 of the front end assembly 16 (which is fixed at the same position for both the high and low underbody load floors forward of a B-pillar (not shown) to maintain the position of a driver of the motor vehicle 12). It should also be appreciated that the transition structure 30 is used to achieve the different underbody load floor heights for the high and low underbody load floors to accommodate the different heights of the rear relative to the front of the motor vehicle 12.

The underbody assembly 10 may include a pair of extensions 36 positioned on the bottom of the rear side members 37 connected to the floor pan 20 and a rear sill (not shown) for the high underbody load floor of FIGS. 1 and 3 to maintain the size of a rear door opening, allowing the use of the common rear doors 18. The extensions 36 extend longitudinally and are operatively connected to the rear side members 37 by suitable means such as welding. The extensions 36 allow the rear side members 37 to make a transition to the rear door opening.

Such a load floor or floor pan as noted above includes substantial structural reinforcements, such as metal bars or tubes, to meet the load requirements. Such structure is typically very heavy and manufacturing costs and complexity are high, therefore improvements are desirable.

Sandwich-type materials having cellular cores have very important characteristics resulting from their being light in weight yet very rigid.

Conventionally, such a panel is constructed by sandwiching a cellular core having low strength characteristics by gluing it or bonding it between two skins, each of which is much thinner than the cellular core but has excellent mechanical characteristics.

The patent document FR 2 711 573 discloses a method of making a panel of sandwich-type composite structure having a cellular core. In that method, said panel is made in a single step by subjecting a stack to cold-pressing in a mold, which stack is made up of at least a first skin made of a stampable reinforced thermoplastics material, of a cellular core made of a thermoplastics material, of a second skin made of a stampable reinforced thermoplastics material, and of a first external covering layer made of a woven or non-woven material, the skins being preheated outside the mold to a softening temperature.

Such a method is particularly advantageous because of the fact that it makes it possible, in a single operation, both to generate cohesion between the various layers of the composite structure, and to shape the panel.

The resulting panel conserves all of the mechanical properties imparted by the cellular core sandwich structure.

European patent EP 0 649 736 B1 explains the principle of molding substantially flat parts out of thermoplastic sandwich material (TSM). The part is made in a single stage by pressing in a cold mold, at a pressure in the range of 10 bars to 30 bars, a stack consisting of at least a first top skin layer of stampable reinforced thermoplastics material, a cellular or honeycomb core of thermoplastics material and a second bottom skin layer of stampable reinforced thermoplastics material. The axes of the cells of the cellular core are generally oriented perpendicular to the skin layers. The skin layers and core are previously heated outside the mold to a softening temperature. Such sandwich material is also described in U.S. Pat. No. 5,683,782. The cellular core of such material enables the part to be very rigid while being light in weight.

U.S. Pat. No. 6,050,630 discloses a molded composite stack including a cellular core for a vehicle and a mold for forming the stack into a vehicular part, such as a floor panel.

Panels of sandwich-type composite structures having a cellular core have strength characteristics sufficient to enable mechanical structures subjected to large stresses to be reinforced structurally without making them too heavy. Such panels are in common use in shipbuilding, aircraft construction, and rail vehicle construction.

However, the non-uniformness of the mechanical stresses to which they are subjected sometimes makes it necessary to form local reinforcing plies at those places in said panels where the mechanical stresses are greatest.

In the field of aircraft construction, sandwich structure composite panels are made that are based on thermosettable resins reinforced with glass fibers.

In order to impart the desired shapes to the panels, and to maintain the shapes, the glass fibers and the thermosettable resin (in the form of pre-impregnates) are deposited layer-by-layer in a mold, and are then heated to high temperatures so as to cure (i.e. polymerize) the resin permanently.

The molds used may have a punch or a die, or else both a punch and a die.

Making such locally-reinforced panels consists firstly in defining zones where stresses are concentrated in the resulting panels, such zones being defined either by real testing or by computer simulation, and then in adding reinforcing plies at those places so as to make it possible to withstand such stresses.

The reinforcing plies are one-directional mats or woven fabrics of glass fibers, of carbon fibers, or of natural fibers embedded in a thermosettable resin, with an orientation that is determined by the orientation of the stresses. They are cut out to a pattern using special machines, e.g. water-jet cutting machines.

The reinforcing plies are disposed layer-by-layer in a mold, either manually or by means of a robot, with each ply having its own orientation.

That operation may be referred to as the "laying up" operation.

Then comes the baking step which is the longest step of the method of making such pieces because the stack of layers must be heated sufficiently to cure the thermosettable resin.

The various layers disposed in the mold are pressed in the mold by evacuating the mold. Such evacuation serves to press the materials against the die or the punch, and to remove surplus resin.

The desired shape is thus obtained with the fibers being impregnated with the resin as well as possible.

That "lamination" technique, and in particular the "laying up" operation, is characterized by a very low level of automation, and a large labor input.

Although, by means of the concept of localizing the strength, that technique makes it possible to achieve performance levels that are high for the pieces that are made in that way, it requires rigorous monitoring of quality.

As a result, that technique is very costly and cannot be used at the high production throughputs implemented in many fields such as the automobile industry.

U.S. Pat. No. 6,136,259 discloses a carpeted load floor for a vehicle which is blow molded and has an internal cavity.

Plastics processing technology has enjoyed significant recent advances, such that traditional high-strength materials such as metals are being replaced with fiber composite materials. These materials are not only light, but also are flexible and durable.

U.S. Pat. Nos. 5,891,560 and 6,165,604 disclose fiber-reinforced composites prepared from a depolymerizable and repolymerizable polymer having the processing advantages of a thermoset without being brittle. Impregnation of polymer into the fiber bundle is achieved, while still producing a composite with desirable physical properties and high damage tolerance.

Other load floors or floor pans are shown in the following U.S. patents: U.S. Pat. Nos. 6,179,362; 6,065,795; 6,053,566; 6,045,174; 6,209,205; 6,170,905; 6,128,815; 6,039,351; and 6,036,252.

As noted in the above-mentioned '560 and '604 patents, although thermoset composites have excellent mechanical properties, they suffer from several disadvantages: thermoset matrices have relatively limited elongation, the thermoset precursors are a source of undesirable volatile organic compounds (VOCs), the composites cannot be reshaped or recycled, and their production rates are limited.

Consequently, in principle at least, thermoplastic composites would solve many of the problems associated with thermosets. For example, unlike thermosets, thermoplastics can be reshaped, welded, staked, or thermoformed. Furthermore, thermoplastics are generally tougher, more ductile, and have greater elongation than thermosets.

SUMMARY OF THE INVENTION

An object of the present invention is to provide a reinforced composite vehicle load floor of the cellular core sandwich-type which can be made simply and cheaply, and can be implemented at high throughputs.

In carrying out the above object and other objects of the present invention, a reinforced composite vehicle load floor of the sandwich type having a cellular core is disclosed. The load floor includes: a) a load-bearing upper skin made of a reinforced thermoplastics material; b) an upper skeletal frame structure of reinforcing slats; c) a cellular core made of a thermoplastics material; d) a lower skeletal frame structure of reinforcing slats; and e) a bottom skin made of a reinforced thermoplastics material. The upper and lower skeletal frame structures of reinforcing slats are positioned symmetrically with respect to a plane formed by the cellular core at predetermined places against the skins and the cellular core.

Slats of each of the frame structures may be positioned adjacent to the front, back and side edges of the load floor and may extend from positions adjacent front, back and side edges of the load floor to a center of the load floor.

The load floor may include at least one outer covering layer made of a woven or non-woven fabric disposed on the upper skin such that the load floor is carpeted load floor.

The load floor may be substantially flat and may be obtained from a single pressing stage. The single pressing stage may have a forming pressure for forming the load floor which lies in the range $10^6$ Pa to $3 \times 10^6$ Pa.

The load floor may be a deep-drawn load floor and the load floor may be obtained from a pair of pressing stages.

While the load floor is being formed, the skins may have a forming temperature lying in the range approximately 160° C. to 200° C.

The skins may be made of a woven fabric or mat of glass fibers and of a thermoplastics material.

The reinforcing slats of the frame structures may be made of reinforced thermoplastic composite. The composite may be fiber-reinforced and may include a depolymerizable and repolymerizable thermoplastic polymer resin. The resin may be a thermoplastic polyurethane.

The thermoplastics material of the skins may be a polyolefin and is preferably polypropylene.

The cellular core of the load floor may have an open-celled structure of the tubular or honeycomb cell type, constituted mainly of polyolefin and preferably polypropylene.

The load floor may be capable of supporting 240 pounds of weight over 100 square inches with not more than 10 millimeters of deflection.

The load floor may be a structural component of a vehicle passenger compartment.

The load floor may have a substantially uniform thickness at a central portion thereof.

The depth of the load floor may be more than ten times its thickness.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a top plan view of a load floor of the present invention after the stack of layers of FIG. 2 are processed in a pressing stage with a grid of reinforcing slats illustrated by phantom lines;

FIG. 4 is a side elevational view, partially broken away, of a deep-drawn load floor of the present invention;

FIGS. 5 and 6 are fragmentary cross-sectional views of the load floor of the present invention, showing respective ways of installing the load floor.

DETAILED DESCRIPTION OF THE PREFERRED EMBODIMENTS

Figure 1:
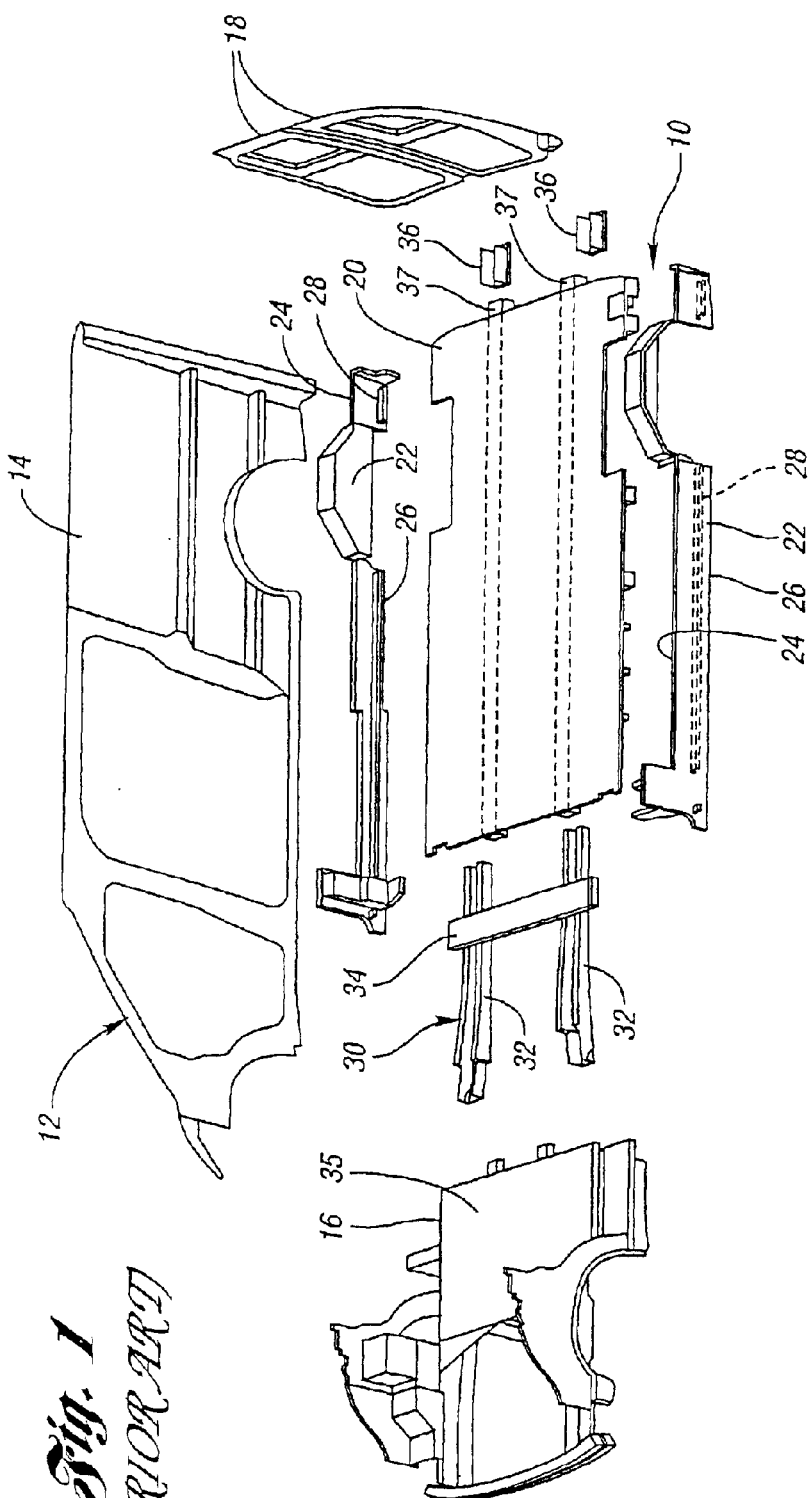
FIG. 1 is an exploded view of a prior art underbody assembly including a load floor.
Figure 2:
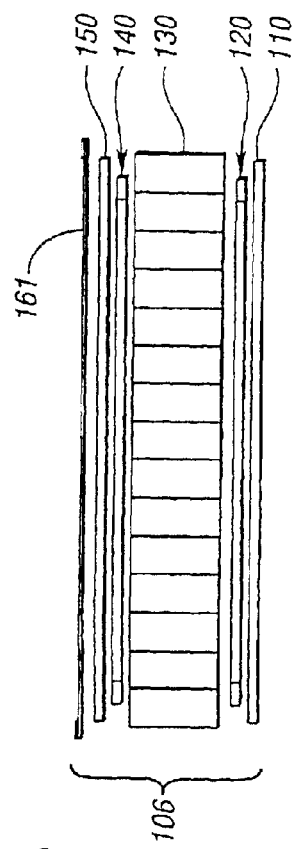
FIG. 2 is a side schematic view of a stack of layers of a load floor of the present invention wherein the layers are shown vertically spaced from each other for clarity.

FIG. 2 shows a stack formed during a first step of a method of making a reinforced composite vehicle load floor of the cellular core sandwich-type of the present invention. The first step is used to make the load floor, generally indicated at 106 in FIG. 2.

In this example, the stack is made up successively of: a bottom skin 110 made of a reinforced thermoplastics material; a lower skeletal frame structure of reinforcing slats 120 each of which may be made of a reinforced thermoplastic composite or pultrusion; a cellular core 130 made of thermoplastics material; an upper skeletal frame structure of reinforcing slats, generally indicated at 140, each of which may be made of a reinforced thermoplastic composite or pultrusion; and a load-bearing upper skin 150 made of a reinforced thermoplastic material. Alternatively, the slats may be made of other types of pultrusions or other materials such as metal.

In addition, the stack includes an outer covering layer 161 made of a woven or non-woven material disposed on the second skin 150. The outer covering layer 161 may be made of felt or of carpeting such as polypropylene carpeting.

Each of the skeletal frame structures of reinforcing slats 120 and 140 has a surface area smaller than the surface area of each of the first and second skins 110 and 150, respectively. The frame structures of reinforcing slats 120 and 140, respectively, are positioned symmetrically about the plane formed by the cellular core 130 at determined places against the skins 110 and 150, respectively. More particularly, the frame structures of slats 120 and 140 are positioned at those predetermined places of the load floor 106 which are to be subjected to the greatest mechanical stresses caused by the load which is supported by the load floor 106.

Making such locally-reinforced load floors 106 consists firstly in defining zones where stresses are concentrated in the resulting load floors 106, such zones being defined either by real testing or by computer simulation, and then in adding reinforcing slats at those places so as to make it possible to withstand such stresses, thereby forming skeletal frame structures of such slats. The frame structures not only support the skins but also protect the cellular core.

Each of the first and second skins 110 and 150, respectively, is advantageously constituted by a woven fabric or mat of glass fibers and of a thermoplastics material.

Each of the frame works of reinforcing slats 120 and 140 is advantageously made of a reinforced thermoplastic composite of glass fibers and of a thermoplastics material such as a depolymerizable and repolymerizable thermoplastic polymer resin such as polyurethane. The slats may be solid or hollow elongated profiles using pultrusion techniques as described in U.S. Pat. No. 5,891,560. Such technology is generally known as Fulcrum® thermoplastic composite technology wherein Fulcrum® is a trademark of the Dow Chemical Co. of Midland, Mich.

Adding frame structures of reinforcing slats to the stack automatically leads to increased weight of the resulting load floor 106. In order to limit this increase in weight, it is important that the adding of the reinforcing slats to the frame structures be well controlled, and that only the bare minimum be added.

The additional weight of the reinforcing slats may be compensated by reducing the weight per unit area of glass fibers in the skins 110 and 150 used: by combining the weight per unit area of glass fibers in the skins 110 and 150 with the characteristics of the reinforcing slats, it is possible to obtain a load floor of weight equivalent to the weight of a load floor that does not use reinforcing slats, while offering strength that is more suited to its load requirement.

Thus, the skins 110 and 150 are typically of glass fiber weight per unit area that is different from that of the reinforcing slats 120 and 140.

Advantageously in this example, the cellular core 130 is an open-celled structure of the type made up of tubes or of a honeycomb, and it is made mainly of polyolefin and preferably of polypropylene.

In a second step of the method of making the load floor 106, the stack of layers is pre-assembled. Then, the pre-assembled stack is heated in an oven.

The pre-assembled stack is heated such that the skins 110 and 150 of the stack have a forming temperature approximately in the range of 160° C. to 200° C. The temperatures to which the pre-assembled stack is heated are higher than the degradation temperature of the polypropylene constituting the matrices of the skins 110 and 150, as well as the matrices of the reinforcing slats and of the cellular core 130, but that does not degrade the mechanical characteristics of the resulting load floor 106.

The temperature to which the pre-assembled stack is heated in the method of making the load floor 106 lies in a range extending from a low temperature enabling the skins 110 and 150 to be bonded to the cellular core 130, in a time compatible with mass production constraints, without the cellular core 130 of the stack being weakened accordingly, to a maximum temperature while avoiding degrading the polypropylene too rapidly.

In the method of making the load floor 106, it is possible to add the reinforcing slats to the stack that is to be thermoformed to make the load floor 106 because the method offers a heating capability that is sufficient to bond the skins 110 and 150 which are of different thicknesses (due to the added reinforcements).

The quantity of heat transmitted through the skins 110 and 150 and the cellular core 130 is inversely proportional to the thickness of the skins 110 and 150, for identical types of reinforcement.

For a given pre-assembled stack temperature and a given pre-assembled stack-heating time, it is possible to bond a skin of given thickness. If the skin is too thin, it reaches a temperature such that it is degraded. If the skin is too thick, the heat does not arrive in sufficient quantity to enable the skin and the core to be bonded together.

For example, in order to bond a skin made of a 4×1 woven fabric of weight per unit area of 915 g/m$^2$ to a cellular core, provision is made for the heating time to lie in the range 55 seconds to 75 seconds. By using an identical skin of weight per unit area of 1,420 g/m$^2$, a heating time lying in the range 70 seconds to 85 seconds is necessary to bond the skin to the cellular core without degrading it. Similarly, it has been determined that, for an identical skin having a weight per unit area of 710 g/m$^2$, a heating time lying in the range 55 seconds to 65 seconds is necessary to bond it to the cellular core without degrading it.

In the next step of the method of making the load floor 106, after the pre-assembled stack has been heated in an oven, the load floor 106 is formed by subjecting the heated stack to cold-pressing in a mold under a pressure lying in the range 1×10$^6$ Pa to 3×10$^6$ Pa.

The method of making the load floor 106 comprises a small number of operations that are simple and quick to perform. It uses standard equipment (oven, press) for performing the above-mentioned operations which are controlled very well, and therefore entirely suitable for being implemented in the field of the vehicle load floor, in which the parts are formed at high production throughputs, while also guaranteeing constant quality and economic competitiveness.

The load floors made by performing the method of the invention offer strength that is optimized locally, without suffering from any extra weight compared with load floors not including any reinforcing slats, or from any extra manufacturing costs.

Referring now to FIG. 4, there is illustrated a portion of a load floor 206 which is deep-drawn in a pressing stage as shown in the above-noted patent application entitled "Method and System for Molding Thermoplastic Sandwich Material and Deep-Drawn Article Produced Thereby." The load floor 206 is deep-drawn as is sometimes required as shown by the above-noted prior art.

One of the advantageous applications of such load floors whose structure is reinforced by reinforcing slats is to make automotive vehicle load floors and, in particular, such load floors having attachment and support structures formed at their outer periphery 108 or edges of the load floor 106. For example, as shown in FIGS. 5 and 6 (which correspond to FIGS. 14 and 15, respectively, of U.S. Pat. No. 6,050,630), a part 44 as used to form a load floor for the luggage compartment or for the passenger compartment of a motor vehicle after the cold-pressing step. The vehicle includes a structural element 66 defining a shoulder which is rectangular in plan shape and on which part 44 is placed, with face 46 facing away from the shoulder. The shoulder is provided with a rectilinear longitudinal rib or projection 68 on an abutment face parallel to the general plane of the part, which rib penetrates into trough 152. A counter-plate 70 fixed to the element 66 and in contact therewith is then disposed in the vicinity of face 46. The counter-plate 70 is also provided with a rectilinear longitudinal rib or projection 72 designed to penetrate into the trough 152. The counter-plate masks the edge or rim 154 of the part 44 from view. The part 44 is thus fixed and positioned accurately without having to drill it or glue it.

FIG. 6 shows an analogous configuration in which the shoulder of the element 66 is not provided with a rib. The part 44 is disposed on the shoulder as above, one of the troughs 152 of the part 44 receiving a pin 72 fixed to the element 66 so as to implement a link via which the part 44 can pivot relative to the element 66.

The use of skeletal frame structures of reinforcement slats in accordance with the present invention makes it possible to reduce both the cost and weight of the load floors for equivalent mechanical characteristics.

The load floor of the invention may be used in any type of land vehicle, sea craft or aircraft. Typically, the load floor is capable of supporting 240 pounds of weight over 100 square inches with not more than 10 millimeters of deflection.

While the best mode for carrying out the invention has been described in detail, those familiar with the art to which this invention relates will recognize various alternative designs and embodiments for practicing the invention as defined by the following claims.

What is claimed is:

1. A reinforced composite vehicle load floor of the sandwich type having a cellular core, the load floor comprising:
   a load-bearing upper skin made of a reinforced thermoplastics material;
   an upper skeletal frame structure of reinforcing slats;
   a cellular core made of a thermoplastics material;
   a lower skeletal frame structure of reinforcing slats; and
   a bottom skin made of a reinforced thermoplastics material; the upper and lower skeletal frame structures of reinforcing slats being positioned symmetrically with respect to a plane formed by the cellular core at predetermined places against the skins and the cellular core wherein the load floor is capable of supporting 240 pounds of weight over 100 square inches with not more than 10 millimeters of deflection.

2. The load floor as claimed in claim 1 wherein slats of each of the frame structures are positioned adjacent to front, back and side edges of the load floor.

3. The load floor as claimed in claim 2 wherein slats of each of the frame structures extend from positions adjacent the front, back and side edges of the load floor to a center of the load floor.

4. The load floor as claimed in claim 1 further comprising at least one outer covering layer made of a woven or non-woven fabric disposed on the upper skin wherein the load floor is a carpeted load floor.

5. The load floor as claimed in claim 1 wherein the load floor is substantially flat and is obtained from a single pressing stage.

6. The load floor as claimed in claim 1 wherein the load floor is a deep-drawn load floor and wherein the load floor is obtained from a pair of pressing stages.

7. The load floor as claimed in claim 5 wherein the single pressing stage has a forming pressure for forming the load floor which lies in the range $10^6$ Pa to $3\times10^6$ Pa.

8. The load floor as claimed in claim 1 wherein while the load floor is being formed, the skins have a forming temperature lying in the range approximately 160° C. to 200° C.

9. The load floor as claimed in claim 1 wherein the skins are made of a woven fabric or mat of glass fibers and of a thermoplastics material.

10. The load floor as claimed in claim 1 wherein the reinforcing slats of the skeletal frame structures are made of reinforced thermoplastic composite.

11. The load floor as claimed in claim 10 wherein the composite is fiber-reinforced.

12. The load floor as claimed in claim 11 wherein the composite includes a depolymerizable and repolymerizable thermoplastic polymer resin.

13. The load floor as claimed in claim 12 wherein the resin is a thermoplastic polyurethane.

14. The load floor as claimed in claim 9 wherein the thermoplastics material of the skins is a polyolefin and preferably polypropylene.

15. The load floor as claimed in claim 1 wherein the cellular core has an open-celled structure of the tubular or honeycomb cell type, constituted mainly of polyolefin and preferably polypropylene.

16. The load floor as claimed in claim 1 wherein the load floor is a structural component of a vehicle passenger compartment.

17. The load floor as claimed in claim 5 wherein the load floor has a substantially uniform thickness at a central portion thereof.

18. The load floor as claimed in claim 6 wherein the load floor has a substantially uniform thickness at a central portion thereof.

19. The load floor as claimed in claim 18 wherein the depth of load floor is more than ten times its thickness.

* * * * *